(12) United States Patent
Tolkachnikov et al.

(10) Patent No.: US 10,899,678 B2
(45) Date of Patent: Jan. 26, 2021

(54) METHOD FOR PROCESSING A CARBON-CONTAINING MATERIAL TO OBTAIN A HUMUS-CONTAINING PRODUCT

(71) Applicants: Yuriy Borisovich Tolkachnikov, Krasnoyarsk (RU); Konstantin Yur'evich Tolkachnikov, Krasnoyarsk (RU); Yuriy Vladimirovich Kos'yanenko, Krasnoyarsk (RU); Vyacheslav Anatol'yevich Titov, Krasnoyarsk (RU); Dmitriy Nikolayevich Kuznetsov, Krasnoyarsk (RU); Artur Mikhaylovich Gorbunov, Krasnoyarsk (RU)

(72) Inventors: Yuriy Borisovich Tolkachnikov, Krasnoyarsk (RU); Konstantin Yur'evich Tolkachnikov, Krasnoyarsk (RU); Yuriy Vladimirovich Kos'yanenko, Krasnoyarsk (RU); Vyacheslav Anatol'yevich Titov, Krasnoyarsk (RU); Dmitriy Nikolayevich Kuznetsov, Krasnoyarsk (RU); Artur Mikhaylovich Gorbunov, Krasnoyarsk (RU)

( * ) Notice: Subject to any disclaimer, the term of this patent is extended or adjusted under 35 U.S.C. 154(b) by 0 days.

(21) Appl. No.: 16/633,186

(22) PCT Filed: May 16, 2019

(86) PCT No.: PCT/RU2019/000342
§ 371 (c)(1),
(2) Date: Jan. 23, 2020

(87) PCT Pub. No.: WO2020/005105
PCT Pub. Date: Jan. 2, 2020

(65) Prior Publication Data
US 2020/0407285 A1    Dec. 31, 2020

(30) Foreign Application Priority Data

Jun. 28, 2018    (RU) ................. 2018123630

(51) Int. Cl.
*C05F 11/08*    (2006.01)
*C05G 3/00*    (2020.01)
*C05F 11/02*    (2006.01)

(52) U.S. Cl.
CPC .............. *C05F 11/08* (2013.01); *C05F 11/02* (2013.01); *C05G 3/00* (2013.01)

(58) Field of Classification Search
None
See application file for complete search history.

(56) References Cited

U.S. PATENT DOCUMENTS 4,952,229 A  *  8/1990  Muir ...................... C05F 11/08
                                                                 71/7

FOREIGN PATENT DOCUMENTS

| CN | 102701834 A | 3/2012 |
|---|---|---|
| RU | 1816394 A3 | 12/1995 |
| RU | 2151757 C1 | 6/2000 |
| RU | 2184717 C2 | 7/2002 |
| RU | 2253641 C2 | 6/2005 |
| RU | 2390518 C1 | 5/2010 |
| RU | 2686997 C1 | 5/2019 |

* cited by examiner

Primary Examiner — Wayne A Langel

(57) ABSTRACT

The invention relates to agriculture, in particular to the processing of carbon-containing material to obtain a humus-containing product. A method for processing a carbon-containing material to obtain a humus-containing product by exposing it to a mixture of bacteria consisting of the strains *Acinetobacter calcoaceticus* VKPM (Russian National Collection of Industrial Microorganisms) V-4883, *Pseudomonas denitrificans* VKPM V-4884, *Pseudomonas* sp. *"longa"* VKPM V-4885 in an amount of $(6-8) \times 10^9$, $(3-4) \times 10^9$ and $(2-3) \times 10^9$ cells per 1 L of solution, respectively, in the presence of a phosphorus-containing additive, under aerobic conditions and while stirring, wherein the carbon-containing material is firstly ground to 0.5 mm in a wet mill while sapropel is simultaneously added in an amount of 5-10 wt %, and grinding is carried out for 30 minutes, the resulting mixture is sent into a mixer, into which aluminium industry waste in the form of dust from the cleaning of carbon electrodes with a particle size up to 0.5 mm in an amount of 10-20 wt % and a phosphorus-containing additive in an amount of 0.2-0.6 wt % are fed, mixing is carried out for 5-10 min, the resulting suspension is sent to a fermenter into which an inoculate has been fed beforehand in the form of a mixture of bacteria in an amount of 200-233 L per 1 m$^3$ of suspension, and additionally stirring is performed while air is fed from 0.5 to 2.0 m$^3$/min at a temperature of 15-20° C. for 28-30 h. The invention makes it possible to improve the quality of the target product.

3 Claims, No Drawings

METHOD FOR PROCESSING A CARBON-CONTAINING MATERIAL TO OBTAIN A HUMUS-CONTAINING PRODUCT

The invention relates to agriculture, in particular to the processing of carbon-containing material to obtain a humus-containing product.

There is known an organo-mineral fertilizer containing brown coal, peat, a calcium-containing component in the form of out-of-furnace dust which is a waste of cement production, as well as phosphorite flour, potash and carbamide as mineral fertilizers with the following ratio of components, wt %: brown coal 12-24, out-of-furnace dust 9-15, phosphorite flour 20-30, potash 4-6, carbamide 10-12, peat is the rest (RU 2151757, dated 24 Jun. 1999, publ. 27 Jun. 2000).

However, the insufficient quantity of microorganisms in the organic part of the fertilizer and the unbalanced content of the organic and inorganic constituent parts of the fertilizer do not lead to a quick restoration of the content of humus and microelements in the soil, its fertility diminishes.

There is known a method for obtaining an organic fertilizer from brown coal, wherein a water-coal suspension of high-ash coal is treated with microorganisms with stirring, aeration and heating up to 25-32° C. Coryneform bacteria *ARTHROBACTER* SSP is used as microorganisms. Stirring, aeration and heating up to 25-32° C. are performed for 48 h, with phosphorite flour 0:5-1% of the mass of the solid material being added. The method allows for obtaining a fertilizer with an increased amount of trace elements from coal with ash content of 37-45%. (RU 2184 717, dated 3 Feb. 2000, publ. 10 Jul. 2002).

The disadvantages of the known method are the low degree of dispersion of the carbon-containing material, as well as a need for heating throughout the entire bioprocessing cycle and the duration of the cycle up to 48 hours.

There is known a method for obtaining a biostimulator of plant growth from humus-containing substances containing live soil microorganisms, namely from vermicompost (biohumus), zoocompost, composts, brown coal, peat and sapropel. The method includes pre-soaking of humus-containing substances in water and mixing followed by alkaline extraction, separation of the alkaline extract and its neutralization. After preliminary soaking of humus-containing substances in water and mixing, microbiological fermentation is performed with the biomass of soil microorganisms being built-up at a temperature of 20-35° C. for 3-24 hours with continuous aeration, and being settled afterwards with an enriched aqueous extract being obtained thereby. The obtained aqueous extract is separated from the precipitate of the humus-containing substance and added to the neutralized alkaline extract obtained from the humus-containing precipitate. Alkaline extraction is performed with 0.02-0.3N alkali solution at 60-100° C. with the alkaline extract being subsequently neutralized to a pH value of 8.0-9.5 after its separation. Afterwards, the obtained enriched aqueous extract is added, mixed, settled, with a liquid target product being obtained thereby. (RU 2253641, dated 25 Dec. 2002, publ. 10 Jun. 2005).

The invention allows for improving the quality of the target product by increasing the amount of humic substances, increasing the proportion of low molecular weight fractions thereof, composts, brown coal, peat and sapropel, as well as increasing the biomass of useful soil microorganisms. This method allows for obtaining a preparation of liquid biohumus containing water-soluble substances (micro- and macronutrients and some physiologically active substances), as well as a biocenosis of useful soil microorganisms, which, when introduced into the soil, multiplies and facilitates enriching the soil with the substances required for plant growth and development.

However, the disadvantage of this method for obtaining a complex fertilizer is that with this method, a small amount of water-soluble compounds goes into the aqueous phase in the solid fraction of vermicompost, and most of the humic substances contained in the vermicompost itself remain in the water-insoluble precipitate and are removed by settling and filtering the aqueous suspension.

Closest to the proposed method is the method for processing a carbon-containing material, which allows for obtaining a finely divided, suspended product with a high content of humic acids and water-soluble fractions in it, which are well absorbed by plants and activate biochemical processes in the soil. The oxidation of the carbon-containing material is performed using the mixture of bacteria obtained by adaptation of the association of microorganisms oxidizing wheat straw to the carbon-containing material being processed. The process is performed in the presence of an aqueous solution containing mobile phosphorus at a temperature of 20 35° C., with the mixture being stirred until a stable non-precipitating suspension is obtained, with the ratio of solid and liquid components being 1:4 and aeration being performed (SU 1816394, dated 10 Aug. 1989).

The disadvantages of the method may include stratification of the humus-containing suspension during its storage for more than one day, use of an insufficiently ground carbon-containing material due to the fact that unprocessed carbon particles remain in the target product, which reduces the yield of humic acids, water-soluble salts.

The present invention is aimed at improving the quality of the target product by increasing the amount of humic substances, increasing the proportion of low molecular weight fractions thereof, as well as increasing the biomass of useful soil microorganisms, which, in turn, increases the agrochemical efficiency of its use.

This is achieved by the fact that in the method for processing a carbon-containing material to obtain a humus-containing product by exposing it to a mixture of bacteria consisting of the strains *Acinetobacter calcoaceticus* VKPM (Russian National Collection of Industrial Microorganisms) V-4883, *Pseudomonas denitrificans* VKPM V-4884, *Pseudomonas* sp. "*longa*" VKPM V-4885 in an amount of $(6-8) \cdot 10^9$, $(3-4) \cdot 10^9$ and $(2-3) \cdot 10^9$ cells per 1 L of solution, respectively, in the presence of a phosphorus-containing additive, under aerobic conditions and while stirring according to the invention, the carbon-containing material is firstly ground to 0.5 mm in a wet mill while sapropel is simultaneously added in an amount of 5-10 wt %, and grinding is carried out for 30 minutes, the resulting mixture is sent into a mixer, into which aluminium industry waste in the form of dust from the cleaning of carbon electrodes with a particle size up to 0.5 mm in an amount of 10-20 wt % and a phosphorus-containing additive in an amount of 0.2-0.6 wt % are fed, mixing is carried out for 5-10 min, the resulting suspension is sent to a fermenter into which an inoculate has been fed beforehand in the form of a mixture of bacteria in an amount of 200-233 L per 1 $m^3$ of suspension, and additionally stirring is performed while air is fed from 0.5 to 2.0 $m^3$/min at a temperature of 15-20° C. for 28-30 h.

Particular features aimed at achieving the same purpose of the invention: the stirring process in the fermenter is performed at a ratio of the solid component to the liquid phase of 1:3, and as a phosphorus-containing additive $(NH_4)_2SO_4 + (NH_4)_2HPO_4 + K_2SO_4$ is used.

The prepared nutrient medium is inoculated with a mixture of bacteria consisting of the strains *Acinetobacter calcoaceticus* VKPM V-4883, *Pseudomonas denitrificans* VKPM V-4884 and *Pseudomonas* sp. "*longa*" VKPM V-4885 in an amount $(6-8) \cdot 10^9$, $(3-4) \cdot 10^9$ and $(2-3) \cdot 10^9$ cells per litre of solution, respectively, which are obtained by long adaptation of the association of microorganisms oxidizing wheat straw to the other carbon-containing materials.

The strain *Acinetobacter calcoaceticus* is grown for 2 days at 28° C. on a nutrient agar with the following composition: agar 2%, peptone 0.5%, sodium acetate 0.5%, yeast hydrolyzate 0.5%, dist. $H_2O$ is the rest, pH is 7.0.

The strains *Pseudomonas denitrificans*, *Pseudomonas* sp. "*longa*" are grown for 2 days at 28° C. on a nutrient agar with the following composition: glucose 1%, yeast hydrolyzate 0.5%, $K_2HPO_4$ 0.1%, $(NH_4)_2HPO_4$ 0.1%, $MgSO_4$ 0.05%, $CaCl_2$ 0.01%, $FeSO_4$ and NaCl, traces: agar 2%, distilled $H_2O$ is the rest: pH 7.0.

Dust from the cleaning of carbon electrodes, aluminium industry waste, is a finely divided product with a carbon grain size of less than 0.5 mm and a carbon content of 93-95%, $SiO_2$ 4%, $Al_2O_3$ 1%, $Fe_2O_3$ 0.2%, CaO 0.3%.

The addition of aluminium industry waste in the form of substances from the cleaning of carbon electrodes serves as an additional source of feeding carbon to the mixture of microorganism strains used since the carbon content in this waste is 93-95% and, in addition, allows for disposal of aluminium industry waste.

Grinding carbon-containing materials (coal, waste, sapropels) to 0.5 mm is required for accelerating the process of microbiological activity and reduce their processing time by 3-4 hours, while 0.5 mm is the optimal nutrient medium for interaction with a mixture of bacteria consisting of strains. The grinding process in a wet mill allows for reducing dust content and the risk of inflammability when loading dusty particles.

The addition of sapropels is used for the purpose of eliminating stratification, both during and after bioprocessing, in the finished target product for a long time, for at least 1 year, since sapropels have an adhesive ability and a finely dispersed state of mineral particles, the content of potassium cation in sapropels and in the ammophoska $(NH_4)_2SO_4 + (NH_4)_2 + K_2SO_4$ promotes the swelling of biocolloids, converting them to a stable state of sol, potassium increases the degree of dispersion of biocolloids and enhances their hydration. Potassium improves the entire course of metabolic processes. The introduction of sapropel to the carbon-containing suspension serves as an additional source of nitrogen, phosphorus, macroelements: calcium, potassium, magnesium, sodium, sulphur and microelements: molybdenum, copper, zinc, selenium, manganese, as well as humic acids, up to 48%, by weight of all organic matter in sapropels: 68-72%.

The method is implemented as follows.

The carbon-containing material in the form of oxidized brown coal is ground in the wet mill to particles no more than 0.5 mm for 30 minutes. The residue on the 0.5-mm sieve should not be more than 3% of particles larger than 0.5 mm. Wetting is performed with tap water settled for at least 2 hours. Afterwards, the ground mixture is sent to a correction tank, mixer, where the solid content in the liquid is adjusted to 1:3, and aluminium industry waste is added in the form of dust from cleaning of carbon electrodes with a particle content of up to 0.5 mm and a phosphorus- and potassium-correcting additive (ammophoska) in an amount of 0.2-0.6 g/l to create a favorable nutrition regimen for bacteria in the fermenter. The nutrient mixture from the mixer is fed to the fermenter, the amount of air in the fermenter is 0.5-2.0 $m^3$ per minute per 1 cubic metre of suspension volume, and the amount of inoculum is in the amount of 233 litres per 1 cubic metre of humus-containing suspension, the process temperature being 15-20° C., and the bioprocessing time being 30 hours. Preloading inoculum in the amount of 233 litres per 1 cubic metre of the mixture is required for preventing sedimentation of carbon-containing particles at the beginning of loading the medium and for preventing the "clogging" of the mixing device in the lower part of the fermenter in case of a sudden power outage and due to the fact that inoculum has colloidal properties that hold unprocessed carbon-containing particles. Inoculum for the preparation of a nutrient medium with all additives consists of a mixture of bacteria (the ratio of solid to liquid in it is 1:3) consisting of strains: *Acinetobacter calcoaceticus* VKPM-4883, *Pseudomonas denitrificans* VKPM-4884, *Pseudomonas* sp "*longa*" VKPM-4885 in an amount (6-8) 10 bln., (3-4) 10 bln., (2-3) bln. cells per 1 litre of solution. The nutrient mixture with additives and inoculum ground in a mill and adjusted for potassium, phosphorus, micro- and macroelements with the addition of water providing for a ratio of the solid component to the liquid phase of 1:3 is stirred in the fermenter for 28-30 hours with an air supply of 0.5-2.0 $m^3$ per minute per 1 cubic metre of the mixture at a temperature of 15-20° C., with the maximum yield of soluble compounds being achieved. After active stirring, a homogeneous dark brown to black coloured humus-containing suspension containing water-soluble substances is formed.

The results of the examples of the present method are given in tables 1-4.

The method for processing a carbon-containing material is simple in terms of technical design, inexpensive, environmentally friendly, waste-free, provides microbiological transformation of poorly soluble organic and mineral components of a processed material into soluble forms that are absorbed by higher plants and activate biochemical processes in the soil. This makes it possible to forgo using additionally other, simple and complex, mineral fertilizers, to decrease the rates of fertilizer application per unit of fertilized area, to reduce the amount of agricultural work and to boost soil fertility.

TABLE 1

Relationship between processing time and degree of grinding

| Amount of added microorganisms (cells per one litre) | Degree of grinding a carbon-containing material, mm. | Processing time, hours | Yield of water-soluble compounds, % of dry matter |
|---|---|---|---|
| Mixture of strains: | The prototype | | |
| VKPM V-4883, VKPM V-4884, VKPM V-4885 in the ratio of cells per litre, respectively, (6-8)10 bln., | 5 mm with the ratio S:W 1:3 | 35-37 | 28-57 |
| | According to the proposed method | | |
| (3-4) 10 bln., (2-3) 10 bln. | 0.5 mm with the ratio S:L 1:3 | 28-30 | 58-62 |

TABLE 2

Relationship between processing a carbon-containing material and phosphorus-containing additive

| Phosphorus-containing additive | Loading weight, g/l | Mobile forms | | Humic acids, % | Water-soluble fractions, % |
|---|---|---|---|---|---|
| | | $NH_3$ | $P_2O_5$ | | |
| $(NH_4)_2SO_4$ + $(NH_4)_2HPO_4$ + $K_2SO_4$ | 0.0 | 0.0 | 0.0 | 35 | 15.9 |
| | 0.1 | 0.1 | 0.001 | 35.9 | 20.9 |
| | 0.2 | 0.15 | 0.02 | 39.6 | 26.1 |
| | 0.5 | 0.5 | 0.05 | 43.5 | 43.4 |
| | 0.6 | 0.3 | 0.05 | 46.8 | 43.6 |
| | 1.5 | 0.25 | 015 | 46.8 | 38.1 |

TABLE 3

Relationship between processing a carbon-containing material and temperature

| T, °C. | Mobile forms, % | | Humic acids, % | Water-soluble fractions, % |
|---|---|---|---|---|
| | $NH_3$ | $P_2O_5$ | | |
| 10 | 0 | 0.05 | 50.1 | 14.4 |
| 15 | 0.10 | 0.06 | 54.3 | 28.5 |
| 20 | 0.45 | 0.07 | 55.2 | 36.8 |

TABLE 4

Relationship between processing a carbon-containing material and degree of recirculation of the medium (inoculum)

| Recirculation of the medium, litre per 1 $m^3$ | Mobile forms, % | | Humic acids, % | Water-soluble fractions, % | Processing time, hours |
|---|---|---|---|---|---|
| | $NH_3$ | $P_2O_5$ | | | |
| Without inoculum | 0 | 0.05 | 20 | 15.1 | 50 |
| With inoculum | | | | | |
| 50 | 0.05 | 0.12 | 25.1 | 20 | 45 |
| 100 | 0.10 | 0.28 | 30.3 | 30.0 | 40 |
| 200 | 0.25 | 0.40 | 38.0 | 34 | 30 |
| 300 | 0.32 | 0.65 | 41.0 | 45 | 28 |

The method for processing a carbon-containing material is simple in terms of technical design, inexpensive, environmentally friendly, waste-free, provides microbiological transformation of poorly soluble organic and mineral components of a processed material into soluble forms that are absorbed by higher plants and activate biochemical processes in the soil. This makes it possible to forgo using additionally other, simple and complex, mineral fertilizers, to decrease the rates of fertilizer application per unit of fertilized area, to reduce the amount of agricultural work and to boost soil fertility.

The invention claimed is:

1. A method for processing a carbon-containing material to obtain a humus-containing product by exposing it to a mixture of bacteria consisting of the strains *Acinetobacter calcoaceticus* VKPM V-4883, *Pseudomonas denitrificans* VKPM V-4884, *Pseudomonas* sp. "*longa*" VKPM V-4885 in an amount of (6-8) $10^9$, (3-4) $10^9$ and (2-3) $10^9$ cells per 1 L of solution, respectively, in the presence of a phosphorus-containing additive, under aerobic conditions and while stirring, wherein the carbon-containing material is firstly ground to 0.5 mm in a wet mill while sapropel is simultaneously added in an amount of 5-10 wt %, and grinding is carried out for 30 minutes, the resulting mixture is sent into a mixer, into which aluminium industry waste in the form of dust from the cleaning of carbon electrodes with a particle size up to 0.5 mm in an amount of 10-20 wt % and a phosphorus-containing additive in an amount of 0.2-0.6 wt % are fed, mixing is carried out for 5-10 min, the resulting suspension is sent to a fermenter into which an inoculate has been fed beforehand in the form of a mixture of bacteria in an amount of 200-233 L per 1 $m^3$ of suspension, and additionally stirring is performed while air is fed from 0.5 to 2.0 $m^3$/min at a temperature of 15-20° C. for 28-30 h.

2. The method according to claim 1, wherein the stirring process in the fermenter is performed at a ratio of the solid component to the liquid phase of 1:3.

3. The method according to claim 1, wherein as a phosphorus-containing additive $(NH_4)_2SO_4+(NH_4)_2HPO_4+K_2SO_4$ is used.

* * * * *